(12) United States Patent
Houssat et al.

(10) Patent No.: US 10,239,498 B2
(45) Date of Patent: *Mar. 26, 2019

(54) CONNECTOR BETWEEN A WIPER BLADE AND A WIPER ARM DRIVING A WIPING SYSTEM

(71) Applicant: Valeo Systèmes d'Essuyage, Le Mesnil Saint Denis (FR)

(72) Inventors: Stéphane Houssat, Issoire (FR); Claude Aliberti, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/725,989

(22) Filed: Oct. 5, 2017

(65) Prior Publication Data

US 2018/0065600 A1 Mar. 8, 2018

Related U.S. Application Data

(63) Continuation of application No. 14/325,645, filed on Jul. 8, 2014, now Pat. No. 9,783,165.

(30) Foreign Application Priority Data

Jul. 8, 2013 (FR) ...................................... 13 56692

(51) Int. Cl.
*B60S 1/40* (2006.01)
*B60S 1/38* (2006.01)

(52) U.S. Cl.
CPC .......... *B60S 1/3867* (2013.01); *B60S 1/4016* (2013.01); *B60S 1/3848* (2013.01); *B60S 1/4006* (2013.01); *B60S 1/4009* (2013.01); *B60S 1/4019* (2013.01); *B60S 2001/4012* (2013.01)

(58) Field of Classification Search
CPC .... B60S 1/3867; B60S 1/4016; B60S 1/4006; B60S 1/4009
See application file for complete search history.

(56) References Cited

U.S. PATENT DOCUMENTS

| | | | | |
|---|---|---|---|---|
| 5,937,474 A | * | 8/1999 | Hussaini | ............... B60S 1/4003 15/250.32 |
| 2002/0174505 A1 | * | 11/2002 | Kim | ......................... B60S 1/40 15/250.32 |
| 2010/0154159 A1 | * | 6/2010 | Baque | .................. B60S 1/3848 15/250.32 |

* cited by examiner

*Primary Examiner* — Michael Jennings
(74) *Attorney, Agent, or Firm* — Osha Liang LLP

(57) ABSTRACT

A connector for a wiper blade, the connector is configured to cooperate pivotably, by a transverse hinge pin, with an adapter designed to allow an articulation link between the blade and a driving arm, the connector includes a body provided with two opposite side flanges, defining a housing designed to receive the adapter, and a pin between the flanges for the articulation link of the blade to the arm, the flanges include, at each of the ends of the hinge pin, a shoulder configured to allow axial guiding of the articulation link between the blade and the arm, the side flanges is configured to allow lateral flexion of the adapter bearing against the shoulder.

15 Claims, 1 Drawing Sheet

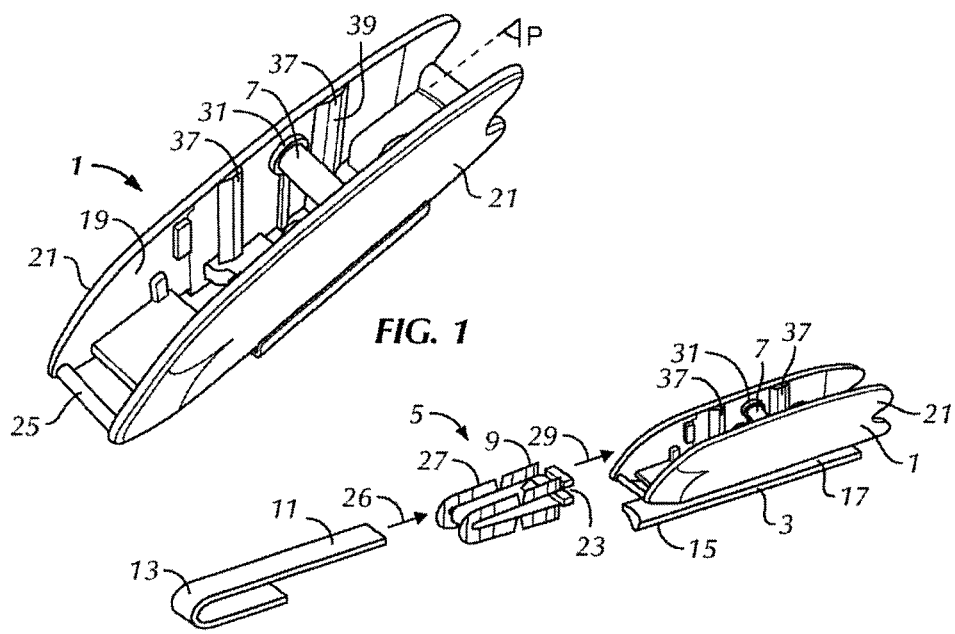
FIG. 1
FIG. 2
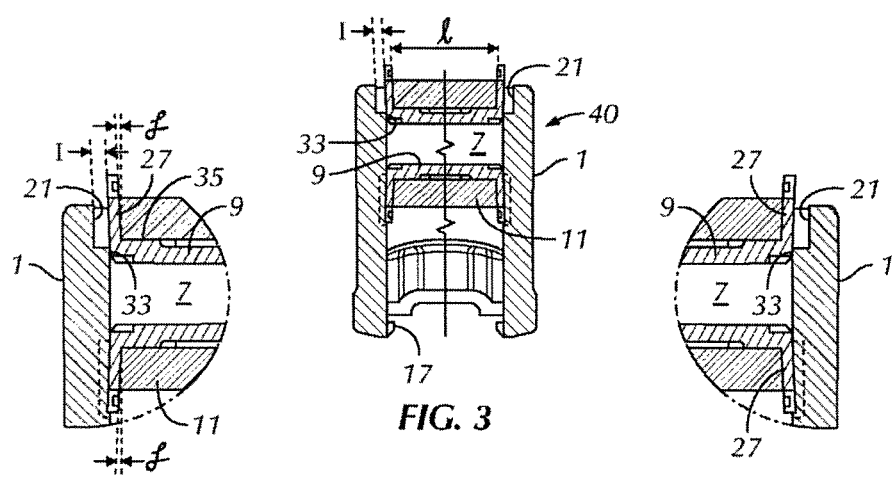
FIG. 5
FIG. 3
FIG. 4

CONNECTOR BETWEEN A WIPER BLADE AND A WIPER ARM DRIVING A WIPING SYSTEM

The present invention relates to a connector for a wiper blade, as well as a fastening device between a wiper blade and a driving arm, a windshield wiper and a wiping system comprising such a connector. It is, in particular, applicable in the field of motor vehicles, in particular heavy trucks.

Motor vehicles are commonly equipped with wiper systems to ensure cleaning of the windshield and prevent the driver's view of the surroundings from being disrupted. The wipers are traditionally driven by arms or wiper holders performing an angular back-and-forth movement and include elongated blades, which in turn bear scrapers made from an elastic material. These scrapers rub against the windshield and evacuate water by bringing it outside the driver's field of vision. The wipers are made in the form either of articulated bars that hold the scraper in several discrete locations, in a traditional version, or, in a more recent version called "flat blade", a semi-rigid assembly that maintains the scraper over its entire length.

It is also known to use a fastening device comprising a connector designed to be fastened to the blade, as well as an adapter capable of being coupled on the one hand to the connector, in articulation around a hinge pin orthogonal to the arm, and on the other hand, fastened to an arm end. It is in particular known to have hook-type arms, whereof the front longitudinal end of the arm is curved in a U-shaped so as to engage on the adapter.

To that end, said adapter comprises a body that receives the end of the arm between two opposite side wings, situated on either side of side flanges of the connector. Nevertheless, in the known fastening devices, the connector cannot receive arms with a size slightly larger than that which is provided or standard without compromising the articulation of the blades on the arm. In fact, although some adapters may receive such arms with a slight deformation of their side wings, the friction against the flanges of the connector is then too significant to allow an articulation of the blade, in light of the deformation of the adapter.

There is thus a need to improve the known solutions.

To that end, the invention relates to a connector for a wiper blade, said connector being configured to cooperate pivotably, by a transverse hinge pin, with an adapter designed to allow an articulation link between said blade and a driving arm, said connector comprising a body provided with two opposite side flanges, defining a housing designed to receive said adapter, and a pin between said flanges for said articulation link of the blade to the arm, said flanges comprising, at each of the ends of the hinge pin, a shoulder configured to allow axial guiding of said articulation link between the blade and the arm, said side flanges being configured to allow lateral flexion of the adapter bearing against said shoulder.

Owing to the lateral flexion of the adapter, in particular its side wings, the latter can receive arms larger than those provided. Owing to said shoulders, the invention further makes it possible to limit the friction of the adapter against the flanks of the connector by keeping them separated, at least over part of their surface.

Advantageously, such a holder comprises a bearing zone for the axial guidance of said articulation link between the blade and the arm, defining a lateral interval between the edge of said shoulder and the corresponding flange of the connector, in which said lateral flexion is exerted.

According to various embodiments of the invention, which may be considered together or separately:
said shoulder is circular,
said shoulder is coaxial to said pin,
the maximum diameter of said shoulder corresponding to a dimension aligned with a bottom of an arm housing of the adapter,
said hinge pin is secured to the connector, in particular said side flanges,
at least one of said side connector flanges is provided with at least one stud able to be applied with play against a corresponding side wing of the adapter, in particular to consolidate said axial guiding of said hinge pin between the blade and the arm and to limit any rubbing of the connector against said corresponding side wing of the adapter,
said stud play is provided to absorb a lateral deformation of the adapter when it receives a driving arm of a windshield wiper system with a dimension larger than that which is provided or standard,
each of said side connector flanges is provided with at least one said stud,
the or said studs include a slender end section, for example conical or rounded, preferably regular,
said studs are identical to each other,
there are two of said studs on each of said side flanges,
said two studs are positioned on either side of said hinge pin, on each of said side flanges,
said two studs are positioned at equal distances from said hinge pin,
said studs are rectilinear,
said studs extend substantially perpendicular to the hinge pin and/or to said blade,
said studs are positioned across from each other on said side connection flanges,
said studs are positioned so as to be located across from side wing lugs of the adapter,
said connector is made in a single piece, preferably by material molding, in particular plastic material.

The invention also relates to a fastening device between a wiper blade and a driving arm for a windshield wiping system of a motor vehicle, comprising a connector as described above and an adapter of said wiping system.

Said adapter is configured to receive a driving arm of the hook type.

The invention also relates to a wiper blade comprising such a connector, and a wiper system comprising said wiper blade and a driving arm of said blade.

The invention will be better understood, and other aims, details, features and advantages thereof will appear more clearly in the following detailed explanatory description of at least one embodiment of the invention provided as a purely illustrative and non-limiting example, in reference to the appended diagrammatic drawings.

In those drawings:

FIG. 1 is a perspective view of a connector for a wiping system according to one embodiment of the invention, FIG. 2 is an exploded perspective view illustrating the mounting of a blade on an arm of the wiping system according to FIG. 1, FIG. 3 is a cross-sectional view of the fastening device of this wiping system, FIG. 4 is a partial view of FIG. 3, on the right side, when the fastening device comprises a driving arm with standard dimensions, and FIG. 5 is a view similar to FIG. 4, but this time from the left side when the fastening device comprises a driving arm with a dimension larger than the standard dimension.

As illustrated in the drawing, in particular in FIG. 1, the invention relates to a connector for a wiper blade 3 of a glass wiping system 5, in particular for a windshield, of a motor vehicle. It may in particular involve a heavy truck. The connector 1 is configured to cooperate pivotably, via a transverse hinge pin 7, with an adapter 9 designed to allow an articulation link between said blade 3 and a driving arm 11 of the wiping system.

The driving arm 11 is of the hook type, its end 13 being U-shaped. It is designed to be fastened by that end 13 to said adapter 9, removably so as to allow the blade to be changed, in particular if it becomes worn.

In this case, said blade 3 is a flat blade. It for example comprises a wiping edge 15 and at least one support frame (not shown) supporting said edge. Said frame comprises one or more vertebrae configured to give the blade a curve allowing it to hug the shape of the windshield. The connector 1 is fastened, in particular crimped, on said blade, by its lower part, here in the form of hooks 17 to cooperate with said frame.

The connector 1 includes a body 19 that has two opposite side flanges 21 designed to define a housing receiving said adapter 9, upon mounting of the blade on the arm. The side flanks 21 support said hinge pin 7 transversely. The adapter 9 is able to interlock movably on said hinge pin 7 by its opening 23 as shown in FIG. 2. Upon mounting, the body 19 of the connector receives, by its front end 25, the end 13 of the driving arm, which then engages along the bending translation 26 between side wings 27 of the adapter 9. Said adapter 9 is mounted on the connector 1 by snapping the pin 7 in a corresponding shape of said adapter.

According to the invention, said side flanges 21 comprise, at each of the ends of the hinge pin 7, a shoulder 31 configured to allow axial guiding of said articulation link between the blade and the arm. The side flanges 21 are further configured to allow lateral flexion of the adapter 9, more specifically flexion f of said side wings 27, which are flexible, bearing against said shoulder 31 when the adapter 9 receives a driving arm 11 with dimensions larger than the standard dimension. This dimension in particular pertains to the width 1 of the end 13 of the arm, which in this way can exceed the standard width by several tenths of a millimeter, as illustrated in FIGS. 4 and 5. The invention thus makes it possible to adapt to the different dimensions of driving arms 11 on which the blades 3 may be mounted, in particular in heavy truck applications.

Each of the shoulders 31 advantageously comprises a bearing zone 33 for axial guiding of said articulation link between the blade and the arm, i.e., between the connector and the adapter, and the lateral interval I defined between the edge plane of said shoulder 31 and the plane of the corresponding flange 21 of the connector, as shown in FIGS. 3 to 5, allows a lateral flexion of the adapter in said interval I, in particular of its side wings 27, in order to receive arms 11 with a dimension larger than the standard dimension.

Said shoulder 31 is circular here, coaxial to the pin 7, but it may have another shape. It has a maximum diameter corresponding to an alignment of its circumference with a bottom 35 of the arm housing of the adapter. Thus, said lateral flexion f is exerted freely beyond said circumference in the interval I. The side flanges 21 may further comprise a rib substantially orthogonal to said axis of rotation, extending between each of said shoulders 31 and the lower part 17 of the connector.

At least one of said side flanges 21 of the connector is provided with at least one stud 37 able to be applied with play (not shown) against a corresponding side wing 27 of the adapter, in particular in the case of an arm 11 with a dimension larger than the standard dimension. This establishes secondary axial guiding of said articulation link between the blade and the arm, in addition to the axial guiding by the shoulders 31, and limits any rubbing of the connector 1 against said corresponding side wing 27 of the adapter.

Said play of the stud is provided to be sufficient to absorb the lateral deformation f of the adapter as illustrated in FIG. 5. In other words, the thickness of the stud, protruding from the side flange plane, is smaller than the overhang of the shoulder of the flange or the depth of the interval I.

Each of said side flanges 21 of the connector is provided with at least one said stud 37; here there are two on each of said side flanges.

Said studs 37 are identical to each other, including a slender end section 39, for example conical or rounded, preferably regular, which reduces the rubbing on the side wings 27.

Said two studs 37 are positioned on either side of said hinge pin 7, on each of said side flanges 21, at equal distances from said hinge pin 7. They are rectilinear, extending substantially perpendicular to said blade 3. Thus, the secondary lateral guiding of the articulation may be done in a balanced manner on either side of the pin 7.

Said studs 37 are positioned across from one another on said side connector flanges 21, in particular so as to be located across from side wing lugs of the adapter, not shown, where potential rubbing may occur. In such a configuration, it is understood that the distance between two studs situated across from each other is greater than the distance provided between the shoulders 31 in order to have the desired play for the flexion of the side wings of the adapter 9.

That connector 1 is advantageously made in a single piece, preferably for material molding, in particular plastic. It further includes a median longitudinal plane of symmetry P.

The fastening device 40 between the wiper blade and the driving arm, also covered by the invention, is more particularly shown in FIG. 3. It comprises the connector 1 and the adapter 9 connected to each other. The adapter 9 is configured to receive a hook-type driving arm 11.

The wiper blade 3 comprising the connector 1, also covered by the invention, is shown in FIG. 2.

The wiper system 5 including the wiper blade 3, the arm 11 of said glass wiping system and the fastening device 40 is also shown in FIG. 2.

The invention thus provides the possibility for glass wiping systems of the type with a hooked arm to receive driving arms with a dimension larger than that provided, which is standard, and therefore makes it possible to broaden the range of received arms.

The invention claimed is:
1. A connector assembly for a wiper blade, the connector assembly comprising:
an adapter comprising two opposite side wings configured to receive, between the two opposite side wings, an end of a driving arm; and
a connector,
wherein the connector is configured to cooperate pivotably, by a transverse hinge pin, with the adapter, thereby forming an articulation link between the wiper blade and the driving arm, the connector comprising:

a body provided with two opposite side flanges, defining a housing configured to receive the adapter; and the transverse hinge pin disposed between the two opposite side flanges with each of two ends of the transverse hinge pin held by one of the two opposite side flanges, the two opposite side flanges comprising, at each end of the transverse hinge pin, a shoulder configured to provide axial guiding of the articulation link between the wiper blade and the driving arm, while establishing an at least partial separation between the two opposite side flanges and the adapter between the two opposite side flanges, thereby limiting friction between the adapter and the two opposite side flanges, and wherein a height of the shoulders is limited to reaching the side wings of the adapter.

2. The connector assembly according to claim 1, wherein the shoulders are substantially circular, coaxial to the transverse hinge pin.

3. The connector assembly according to claim 1, wherein at least one of the two opposite side flanges of the connector is provided with at least one stud, configured to be in mechanical contact with a corresponding side wing of the adapter.

4. The connector assembly according to claim 3, wherein the at least one stud is rectilinear and extends substantially perpendicular to the transverse hinge pin.

5. The connector according to claim 3, wherein the at least one stud has a cross-sectional width that is variable along the stud.

6. The connector assembly according to claim 3,
wherein each of the two opposite side flanges of the connector is provided with at least one stud, and
wherein the studs are positioned across from each other on the two opposite side flanges of the connector.

7. The connector assembly according to claim 1, wherein the adapter comprises an opening at a first end that extends in a longitudinal direction parallel to the side wings and extending approximately the length of the side wings.

8. A wiper system comprising:
a wiper blade; and
a connector assembly, the connector assembly comprising:
an adapter comprising two opposite side wings configured to receive between them an end of a driving arm; and
a connector,
wherein the connector is configured to cooperate pivotably, by a transverse hinge pin, thereby forming an articulation link between the wiper blade and the driving arm, the connector comprising:
a body provided with two opposite side flanges, defining a housing configured to receive the adapter; and
the transverse hinge pin between the two opposite side flanges with each of two ends of the transverse hinge pin held by one of the two opposite side flanges, the two opposite side flanges comprising at each of the two ends of the transverse hinge pin, a shoulder configured to provide axial guiding of the articulation link between the wiper blade and the driving arm, while establishing an at least partial separation between the two opposite side flanges and the adapter between the two opposite side flanges, thereby limiting friction between the adapter and the two opposite side flanges, and wherein a height of the shoulders is limited to reaching the side wings of the adapter.

9. The wiper system according to claim 8, wherein the shoulders are substantially circular, coaxial to the transverse hinge pin.

10. The wiper system according to claim 8, wherein at least one of the two opposite side flanges of the connector is provided with at least one stud, configured to be in mechanical contact with a corresponding side wing of the adapter.

11. The wiper system according to claim 10, wherein the at least one stud is rectilinear and extends substantially perpendicular to the transverse hinge pin.

12. The connector according to claim 10, wherein the at least one stud has a cross-sectional width that is variable along the stud.

13. The wiper system according to claim 10,
wherein each of the two opposite side flanges of the connector is provided with at least one stud, and
wherein the studs are positioned across from each other on the two opposite side flanges of the connector.

14. The wiper system according to claim 8, wherein the adapter comprises an opening at a first end that extends in a longitudinal direction parallel to the side wings and extending approximately the length of the side wings.

15. The wiper system according to claim 8, wherein the end of the driving arm is U-shaped, and wherein an adapter geometry matches the U-shaped end of the driving arm.

* * * * *